United States Patent
Koski et al.

(10) Patent No.: US 7,490,528 B2
(45) Date of Patent: Feb. 17, 2009

(54) PARK INHIBIT ASSEMBLY FOR AN ELECTRIC TRANSMISSION RANGE SELECTION SYSTEM

(75) Inventors: Jack P. Koski, South Lyon, MI (US); Ryan M. Jenness, Ypsilanti, MI (US); Stephen W. Powell, South Lyon, MI (US); Mark A. Vernacchia, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 277 days.

(21) Appl. No.: 11/352,869

(22) Filed: Feb. 13, 2006

(65) Prior Publication Data

US 2007/0191182 A1    Aug. 16, 2007

(51) Int. Cl.
*F16H 59/00* (2006.01)
*F16H 61/00* (2006.01)
*F16H 63/00* (2006.01)

(52) U.S. Cl. .................... 74/336 R; 74/473.21; 477/96; 477/186; 477/187; 192/219.5

(58) Field of Classification Search ........................ None
See application file for complete search history.

(56) References Cited

U.S. PATENT DOCUMENTS

| | | | |
|---|---|---|---|
| 4,722,427 A * | 2/1988 | Prumbaum et al. ....... | 192/219.5 |
| 6,401,899 B1 * | 6/2002 | Kanehisa et al. ......... | 192/219.5 |
| 6,481,556 B1 * | 11/2002 | Haupt ..................... | 192/219.5 |
| 7,025,188 B2 * | 4/2006 | Lindenschmidt et al. . | 192/219.5 |
| 7,156,218 B2 * | 1/2007 | Yamamoto ............... | 192/219.4 |
| 2004/0229726 A1 * | 11/2004 | Wilde et al. .................. | 477/99 |
| 2004/0248686 A1 * | 12/2004 | Berger et al. ................ | 475/131 |
| 2006/0016287 A1 * | 1/2006 | Grossman et al. ........ | 74/473.21 |
| 2007/0044584 A1 * | 3/2007 | Wittkopp ................... | 74/337.5 |

FOREIGN PATENT DOCUMENTS

WO    WO 2004106781 A1 * 12/2004

* cited by examiner

*Primary Examiner*—David D. Le

(57) ABSTRACT

An electronic transmission range selection (ETRS) system for shifting a transmission range of a transmission includes an electro-mechanical park inhibit assembly that operates to disallow the ETRS system from shifting from an Out-of-Park mode to a Park mode under certain circumstances. The park inhibit assembly includes a follower having a recess defined thereon and slidably disposed within a follower bore. In one embodiment a selectively energizable solenoid assembly is mounted substantially perpendicular to the follower and operates to bias a ball into the recess when energized thereby locking the ETRS system in the Out-of-Park mode. In another embodiment the park inhibit assembly includes a selectively energizable motor assembly mounted substantially perpendicular to the follower. The motor assembly operates to enforce the Park and Out-of-Park mode of the ETRS system.

18 Claims, 5 Drawing Sheets

US 7,490,528 B2

PARK INHIBIT ASSEMBLY FOR AN ELECTRIC TRANSMISSION RANGE SELECTION SYSTEM

TECHNICAL FIELD

The present invention relates to electronic transmission range selection (ETRS) systems for automatically shiftable transmissions and more particularly to a park inhibit assembly contained therein.

BACKGROUND OF THE INVENTION

Motorized vehicles include a power plant, such as an internal combustion engine or electric motor, which produces driving power. The driving power is transferred through a transmission to a driveline for driving a set of wheels at selected gear ratios. Typically, the vehicle operator selects a desired transmission operating mode or range. The ranges provided by most automatic transmissions generally include Park, Reverse, Neutral, and Drive. In Drive, the automatic transmission automatically shifts between three, four, five, six, or more forward gear ratios based on the vehicle operating conditions such as vehicle speed and engine torque.

Traditionally, a driver interface device is provided, which the vehicle operator shifts to select the desired transmission range. The driver interface device is linked to the automatic transmission by a range shift mechanism, which typically includes a series of interconnected mechanical devices such as levers, push/pull rods, cables and the like.

More recently, "shift-by-wire" range shift mechanisms have been developed. Conventional shift-by-wire range shift mechanisms are based on an external system having an electric motor for controlling movement of the transmission's manual shaft to the desired range select position. Switches associated with the driver interface device send a mode signal to a transmission controller that is indicative of the selected transmission range. Thereafter, the controller actuates the electric motor to move the transmission manual shaft to the corresponding range select position. Alternately, the "shift by wire" range shift mechanism may be contained internally within the transmission. One such system is described in U.S. Pat. No. 6,880,419, which is hereby incorporated by reference in its entirety.

SUMMARY OF THE INVENTION

A transmission for a vehicle is provided having an electronic transmission range selection (ETRS) system operable to shift the transmission range, including shifting from a Park mode of operation to an Out-of-Park mode of operation and from the Out-of-Park mode of operation to the Park mode of operation. A selectively engageable park pawl mechanism is provided and operates to enforce the Park mode when engaged and to allow the Out-of-Park mode when disengaged. A park inhibit assembly is movable with the park pawl mechanism and operable to block the engagement of the park pawl mechanism when the vehicle is operating above a predetermined speed. The park inhibit assembly includes an electro-mechanical device operable to cooperate with a movable follower member to block the engagement of the park pawl mechanism when the electro-mechanical device is energized. The electro-mechanical device may be mounted in a substantially perpendicular relation to the follower member.

In one embodiment, the electro-mechanical device is a selectively energizable solenoid and the follower member includes a recess. The solenoid is operable to engage the recess of the follower member when the solenoid is energized such that the movement of the follower member within the park inhibit assembly is prohibited.

In another embodiment, the electro-mechanical device is a selectively energizable motor. The motor operates to drive a pinion gear that is in meshing contact with a rack portion provided on the follower member.

The park inhibit assembly may further include a Hall effect switch operable to provide diagnostic and position signals for the follower member when the transmission is in the Park mode and the Out-of-Park mode. Additionally, the park inhibit assembly may further include a printed circuit board operable to modify the diagnostic and position signals. A mechanical contact switch may also be provided and operates to provide diagnostic and position signals for the follower member when the transmission is in the Park mode and the Out-of-Park mode.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
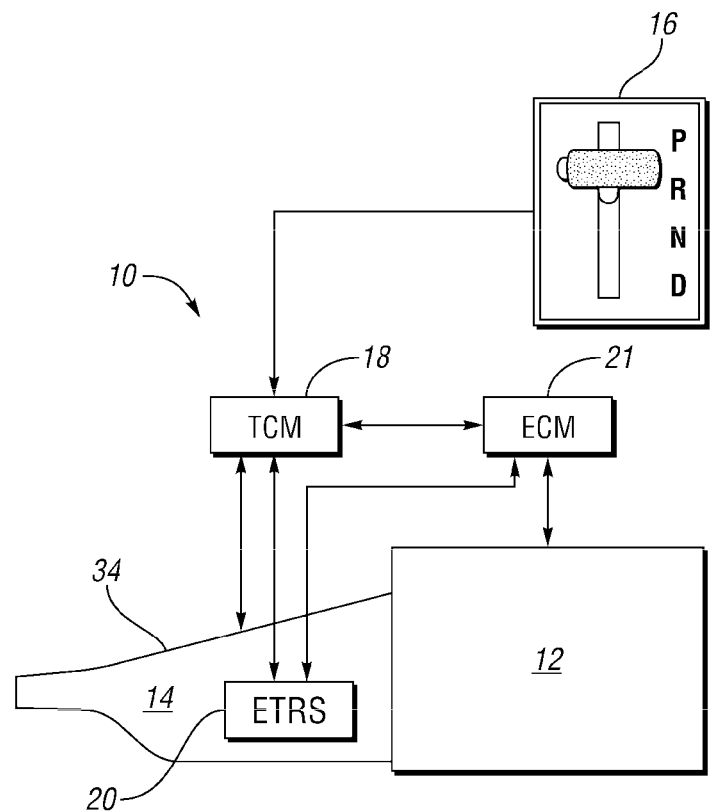
FIG. 1 is a schematic diagrammatic illustration of a partial powertrain for a vehicle having a transmission incorporating an electronic transmission range selection (ETRS) system.

Referring to the figures wherein like reference numbers represent like characters, there is shown in FIG. 1 a schematic illustration of a portion of a powertrain 10. The powertrain 10 includes an engine 12, such as an internal combustion engine, and an automatically shiftable transmission 14. The engine 12 produces driving torque that is transferred through the transmission 14 at varying gear ratios to drive at least one pair of wheels (not shown). A driver interface device 16 enables a vehicle operator to select various transmission range positions. The driver interface device 16 can include a lever, switches, dials, push buttons or any other type of input interface desired. The normal transmission range positions, including Park, Reverse, Neutral, and Drive (PRND) are selectable, as well as manual downshifts and tap-up, tap-down capabilities via actuation of the driver interface device 16. In operation, the driver interface device 16 sends a control signal to a transmission control module, or TCM, 18 based on the selected operating range of the transmission 14.

The TCM 18 signals an electronic transmission range selection (ETRS) system 20 to shift the transmission 14 to the corresponding range in response to the control signal. For purposes of clarity, the ETRS system 20 is considered to be operating in a Park mode when the transmission 14 is in its Park mode of operation and to be operating in an Out-of-Park mode when the transmission 14 is in any other of the available ranges. An engine control module, or ECM, 21 is provided to receive inputs from and send control signals to the engine 12. Additionally, the ECM 21 interfaces with the ETRS system 20 and the TCM 18 to determine the operational range of the transmission 14.

Figure 2:
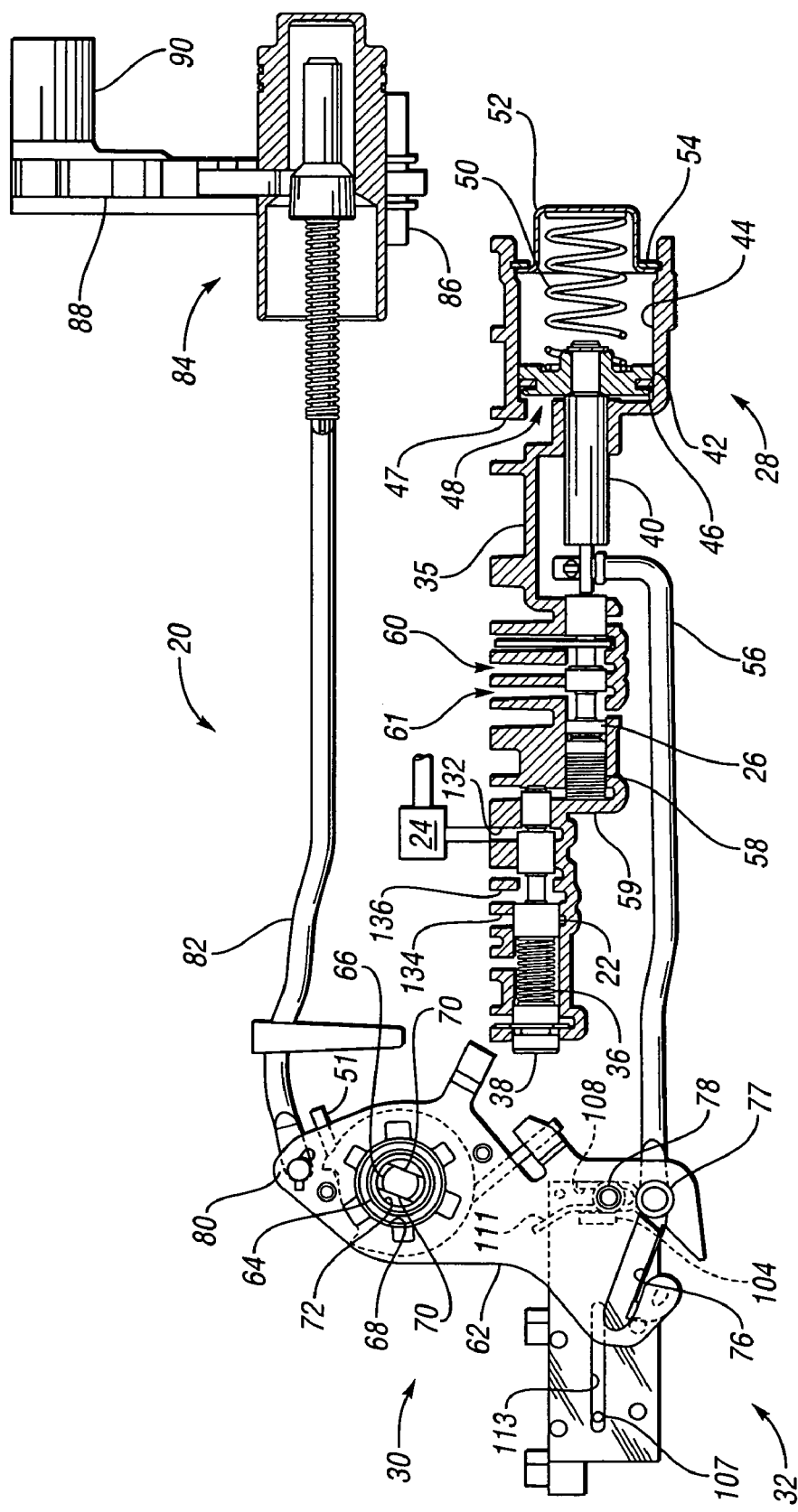
FIG. 2 is a side view of the ETRS system, incorporating a park inhibit assembly consistent with the present invention, in a Park mode.
Figure 3:
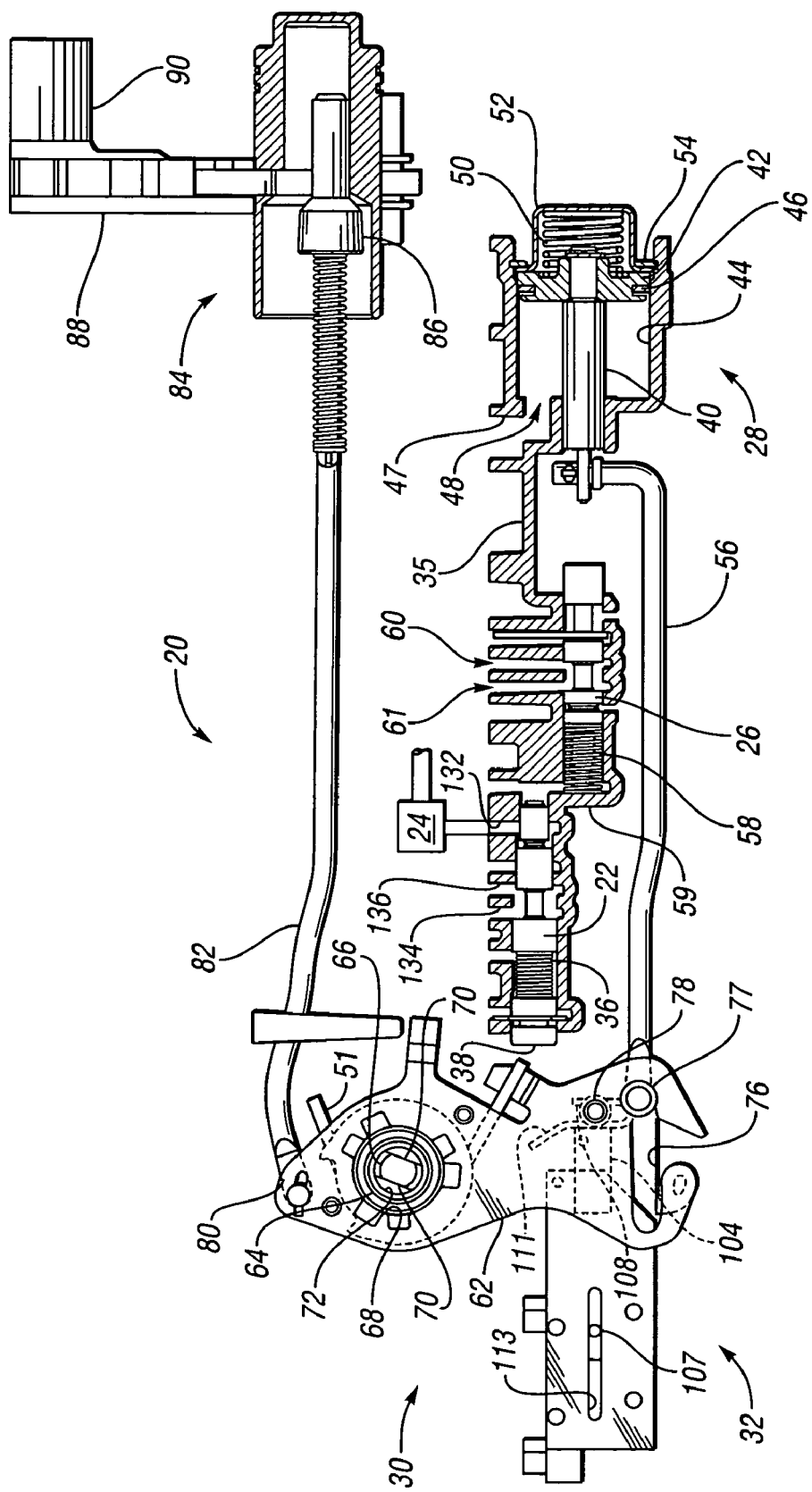
FIG. 3 is a side view of the ETRS system, of FIG. 2, in an Out-of-Park mode.

Referring now to FIGS. 2 and 3, the ETRS system 20 is an integral part of the transmission 14 and operates to manipulate the flow of pressurized fluid to shift the transmission 14 between its various transmission ranges. The ETRS system 20 includes a park servo valve 22, a valve solenoid 24, a forward-reverse enable (FRE) valve 26, a hydraulic servo assembly 28, and a two-position park lever assembly 30. The ETRS system 20 also includes a park inhibit assembly 32 that prevents the transmission 14 from shifting from the Out-of-Park mode into the Park mode of operation in the event of a loss of pressurized fluid under specific circumstances.

The components of the ETRS system 20 are shown supported within a housing 34, shown in FIG. 1, associated with the transmission 14, shown in FIG. 1, which defines a valve body housing 35 having a series of fluid flow passages. FIG. 2 illustrates the position of the various components when the ETRS system 20 is in a Park mode. In contrast, FIG. 3 illustrates the same components moved to positions corresponding to the ETRS system 20 in an Out-of-Park mode. In particular, the park servo valve 22 is slidably supported within the valve body housing 35 for movement between a first position (FIG. 2) and a second position (FIG. 3). The park servo valve 22 is biased to its first position by a spring 36. The spring 36 is disposed between a fixed spring seat 38 and the park servo valve 22. In its first position, the park servo valve 22 prohibits the flow of pressurized fluid to the hydraulic servo assembly 28. As discussed in further detail below, the valve solenoid 24 can be selectively actuated to control the supply of pressurized fluid required for moving the park servo valve 22 between its first and second positions.

With continued reference to FIGS. 2 and 3, the hydraulic servo assembly 28 is shown to include a servo pin 40 having a servo piston 42 fixed thereto. The servo piston 42 is slidably disposed within a cylinder or bore 44 defined by the valve body housing 35 and includes a piston seal 46 disposed about the periphery of the servo piston 42. A port 47 defined by the valve body housing 35 provides a fluid communication path to a pressure chamber 48 formed within the cylinder 44. The servo piston 42 and servo pin 40 are biased to a first position, as shown in FIG. 2, by a spring 50 and a torsion spring 51. The spring 50 seats between the servo piston 42 and a servo cap 52, which is fixed to the valve body housing 35 by a retainer ring 54. An opposite end of the servo pin 40 abuts one end of the FRE valve 26 and is fixed to a first end of an elongated servo link rod 56. The servo link rod 56 operatively connects the servo pin 40 to the park lever assembly 30. As described in further detail below, the flow of pressurized fluid through the port 47 into the pressure chamber 48 induces movement of the servo piston 42 and servo pin 40 to a second position, as shown in FIG. 3, against the biasing force exerted thereon by the spring 50 and the torsion spring 51 of the park lever assembly 30. Movement of the servo pin 40 from its first position to its second position causes the servo link rod 56 to move from a first position, as shown in FIG. 2, to a second position, as shown in FIG. 3. Furthermore, such movement of the servo pin 40 to its second position acts to release it from engagement with the FRE valve 26.

The FRE valve 26 is slidably disposed within a valve chamber formed in the housing 34 for movement between a first position, shown in FIG. 2, and a second position, shown in FIG. 3. When the servo pin 40 of the hydraulic servo assembly 28 is in its first position, the spring 50 and the torsions spring 51 of the park lever assembly 30 hold the FRE valve 26 in its first position in opposition to the biasing force exerted thereon by a spring 58. The spring 58 is seated between the FRE valve 26 and a wall portion 59 of the housing 34. In its first position, the FRE valve 26 blocks the flow of pressurized fluid to the shifting components of the transmission 14. However, upon movement of the servo pin 40 of the hydraulic servo assembly 28 to its second position, the biasing force of the spring 58 forcibly moves the FRE valve 26 to its second position. With the FRE valve 26 in its second position, the flow of pressurized fluid from port 60 is permitted to the shifting components of transmission 14 through port 61 at a desired line pressure.

The park lever assembly 30 includes a lever 62, a bushing 64 and a manual shaft 66. The manual shaft 66 is rotatably supported in one or more aligned apertures defined by the housing 34, shown in FIG. 1, and extends through the bushing 64. The bushing 64 is retained in an aperture 68 formed in the lever 62, whereby the lever 62 is rotatably supported by the bushing 64.

The manual shaft 66 includes a plurality of flats 70 formed along a portion thereof. The manual shaft 66 is received through a keyed aperture 72 of the bushing 64. In particular, flats 70 of the manual shaft 66 engage the bushing 64, thereby fixing the manual shaft 66 and bushing 64 for unitary rotation therewith. However, the lever 62 is free to rotate about the bushing 64. As a result, during normal operation, the manual shaft 66 does not rotate as the ETRS system 20 is moved from the Park mode to the Out-of-Park mode, thereby minimizing drag associated with a manual release mechanism external to the transmission 14.

The lever 62 further includes a slot 76 with a pin 77, fixed to an end of the servo link rod 56, engaging the slot 76. As such, the servo link rod 56 connects lever 62 to the servo pin 40 of the hydraulic servo assembly 28. A pin 78 extends from the lever 62 and, as will be described in more detail, interfaces with moveable components of the park inhibit assembly 32. An aperture 80, defined by the lever 62, facilitates attachment of an end of an actuator rod 82 to the lever 62. The torsion spring 51 is disposed about the bushing 64 and functions to bias the lever 62 to a Park position, as shown in FIG. 2.

The actuator rod 82 is coupled to, or engages, a park pawl mechanism or assembly 84 that operates to selectively move a park pawl 86 into and out of engagement with a toothed wheel 88 that is rigidly mounted with respect to an output shaft 90 of the transmission 14. The park pawl mechanism 84 selectively locks the output shaft 90 of the transmission 14. With the park pawl 86 engaged with the toothed wheel 88, the ETRS system 20 is in the Park mode, as shown in FIG. 2. Alternately, with the park pawl 86 disengaged from the toothed wheel 88, the ETRS system 20 is in the Out-of-Park mode, as shown in FIG. 3. As will be detailed, movement of servo pin 40 from its first position to its second position causes the servo link rod 56 to bias the lever 62. In response, the lever 62 is induced to rotate from the Park position to the Out-of-Park position against the biasing force of the torsion spring 51. Such rotary movement of the lever 62 causes the actuator rod 82 to move from a first position to a second position thereby moving the park pawl 86 to the Out-of-Park position.

Figure 4:
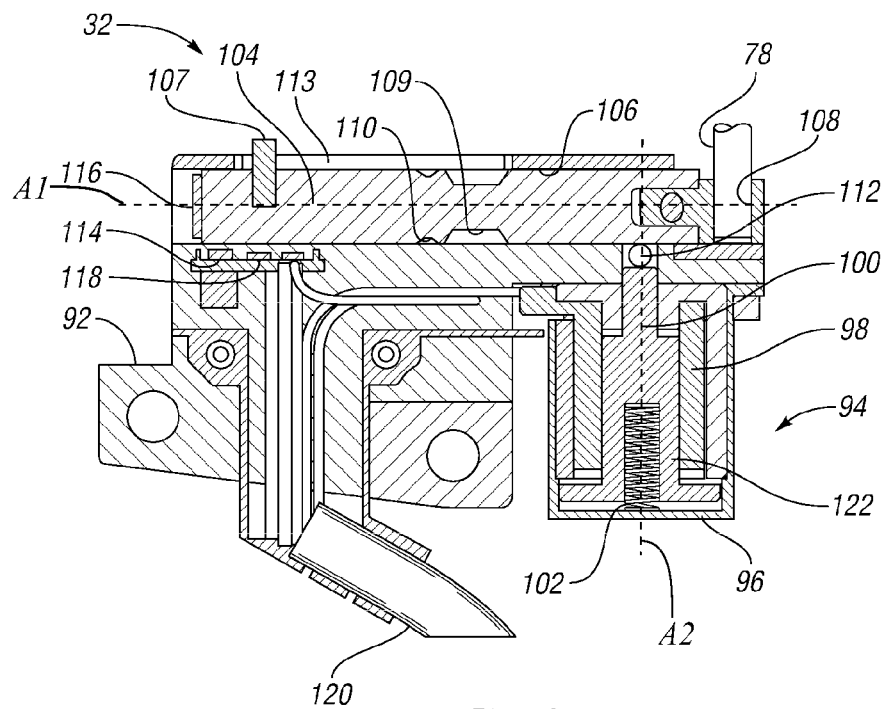
FIG. 4 is a cross-sectional bottom view of the park inhibit assembly, associated with the ETRS system of FIGS. 2 and 3 shown in the Park position.
Figure 5:
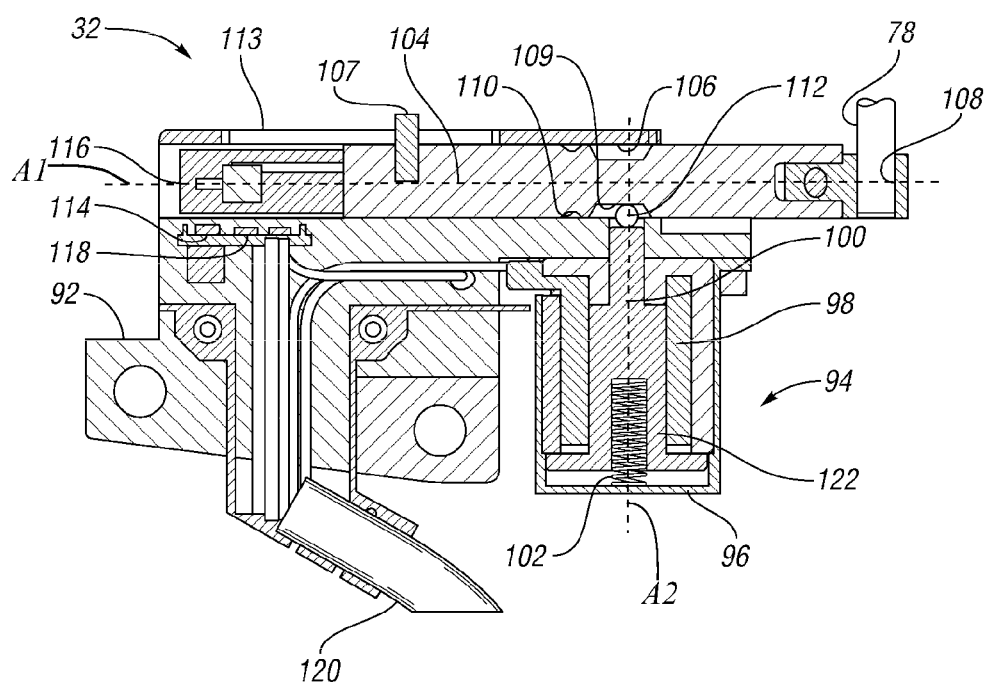
FIG. 5 is a cross-sectional bottom view of the park inhibit assembly, shown in FIG. 4, in the Out-of-Park position.

Referring now to FIGS. 4 and 5, the components associated with the park inhibit assembly 32 will be discussed in greater detail. The park inhibit assembly 32 includes a body 92 that is attached to a portion of the valve body housing 35. The park inhibit assembly 32 also includes an electro-mechanical device or solenoid assembly 94. The solenoid assembly 94 includes a solenoid housing 96. Contained within the solenoid housing 96 is a solenoid coil 98 having a solenoid plunger 100 coaxially and slidably disposed therein along a second axis A2. A solenoid plunger spring 102 operates to provide a bias force to the solenoid plunger 100. As is well known, when electrical current is provided to the solenoid coil 98, an electro-magnetic force will develop biasing the solenoid plunger 100. A follower 104 is slidably disposed along a first axis A1 within a bore 106 defined by the body 92. The second axis A2 of the solenoid plunger 100 is substantially perpendicular to the first axis A2 of the follower 104. Preferably, the follower 104 is formed from a ferrous material. A slot 108 is defined by one end of the follower 104, and is sufficiently configured to receive the pin 78 thereby creating a mechanical link between the lever 62, shown in FIGS. 2 and 3, and the park inhibit assembly 32. The follower 104 has recesses 109 and 110 defined thereon, which operate to receive a ball 112 that is selectively biased into position by the solenoid plunger 100. A pin 107 is fixedly attached to the follower 104 for translation therewith. The pin 107 is reciprocally movable within a slot 113 defined by the body 92 and functions as an anti-rotation feature for the follower 104. Additionally, the pin 107 operates to limit the movement of the follower 104 within the bore 106 and also to prevent removal of the follower 104 from the bore 106.

The park inhibit assembly 32 further includes a contactless back-biased Hall effect switch 114, a mechanical contact switch 116, and a printed circuit board 118. Additionally, a wire harness 120 operates to communicate electrical signals between the park inhibit assembly 32 and the TCM 18, shown in FIG. 1, and the ECM 21, shown in FIG. 1. The wire harness 120 may also communicate electrical signals from other devices such as, for example, a hydraulic pressure switch 121, shown in FIG. 7. The Hall effect switch 114 is powered by the TCM 18 and operates to provide a signal to the TCM 18 when the ETRS system 20 is in the Park mode. The Hall effect switch 114 also operates to provide fault diagnostic signals to the TCM 18, such as short-to-ground, short-to-voltage, and open circuit conditions. When the follower 104 is in close proximity to the Hall effect switch 114, as shown in FIG. 4, a low constant nominal current is produced resulting in a low voltage signal at the TCM 18. Alternately, when the follower 104 moves out of proximity with the Hall effect switch 114, as shown in FIG. 5, a high constant nominal current is produced resulting in a high voltage signal at the TCM 18.

If the Hall effect switch 114 is non-functional or a signal line is broken or shorted to ground, the minimum voltage, i.e. zero volts, is signaled to the TCM 18. Alternately, if the Hall effect signal line is shorted to voltage, the maximum voltage signal is provided to the TCM 18. The Hall effect switch 114 is programmable, such that the switching points may be optimized to accurately indicate if the ETRS system 20 is in a Park mode or Out-of-Park mode. The mechanical contact switch 116 operates to provide a Park position signal to the ECM 21 should the TCM 18 lose power, at which point, the mechanical contact switch 116 will provide the ECM 21 with the necessary signal information to enable the starting of engine 12. The printed circuit board 118 includes a voltage modifier, thereby enabling the use of the park inhibit assembly 32 within other transmissions that may require voltage signals from the Hall effect switch 114 at different voltage levels.

When the ETRS system 20 is in the Out-of-Park mode, shown in FIG. 2, the follower 104 is in an extended position, as shown in FIG. 5. Under certain circumstances, for example when the vehicle is traveling above a threshold speed, the TCM 18 energizes the solenoid assembly 94 of the park inhibit assembly 32 to prevent movement of the follower 104 by locking it in the Out-of-Park position, shown in FIG. 5. More specifically, the spring 102 will bias the solenoid plunger 100 that in turn will urge the ball 112 into engagement with the recess 109. Subsequently the solenoid coil 98 is energized, thereby locking the solenoid plunger 100 in place. The interface between the ball 112 and the recess 109 prohibits the follower 104 from retracting from the extended position. As such, the lever 62, shown in FIGS. 2 and 3, is prohibited from rotating as a result of the contact between the pin 78 and the follower 104.

When the vehicle is operating at or below the threshold speed, the solenoid assembly 94 within the park inhibit assembly 32 is de-energized to enable the ETRS system 20 to shift to the Park mode if desired. More specifically, to enable rotation of the lever 62, shown in FIGS. 2 and 3, to the Park position, as shown in FIG. 4, the solenoid assembly 94 is de-energized to enable the follower 104 to urge the solenoid plunger 100 to the retracted position against the biasing force of spring 102, thereby disengaging the ball 112 from the recess 109. As the follower 104 is pushed into the bore 106 by the lever 62, the solenoid plunger 100 retracts thereby enabling rotation of the lever 62 to its Park position. The recess 110 is provided to aid the installation of the park inhibit assembly 32 within the transmission 14. Additionally the slot 108 may include a lead-in 111, shown in FIGS. 2 and 3, to facilitate insertion the pin 78 into the slot 108.

Figure 6:
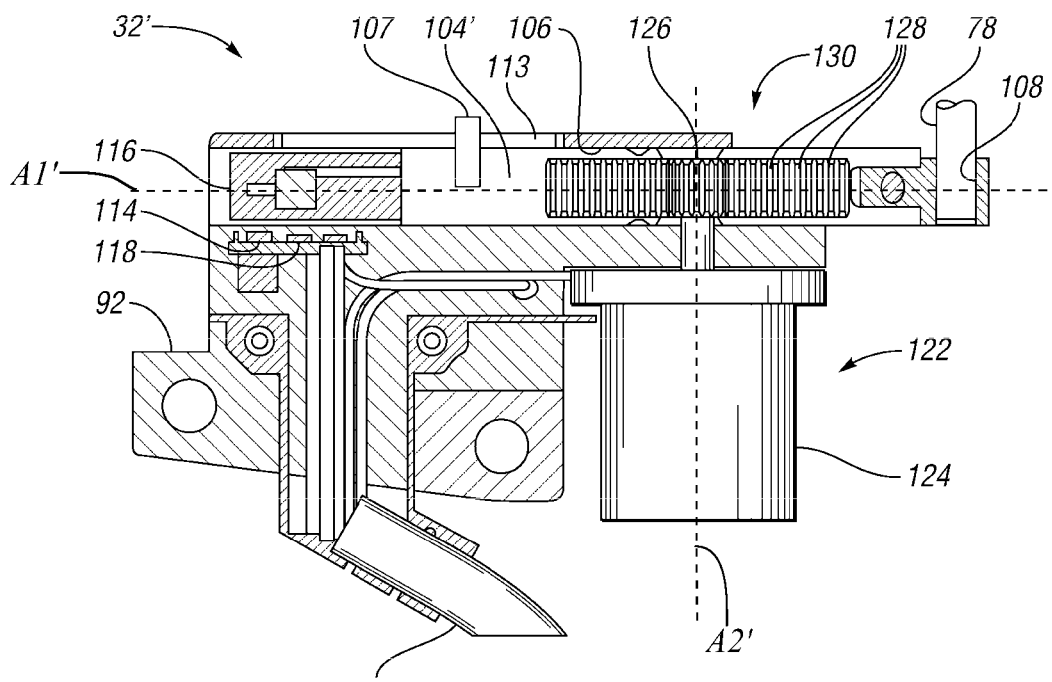
FIG. 6 is a partial cross sectional bottom view of an alternate embodiment of the park inhibit assembly shown in FIGS. 4 and 5.

FIG. 6 illustrates an alternate embodiment of the park inhibit assembly, indicated generally as 32'. The park inhibit assembly 32' includes an electromechanical device or electrically operated motor assembly 122 in place of the solenoid assembly 94, shown in FIGS. 4 and 5. The motor assembly 122 includes an electric motor 124 operable to drive a pinion gear 126. A follower 104' is slidably disposed along a first axis A1' within the body 92 and has a plurality of teeth 128 formed thereon to form a rack portion 130. The pinion gear 126 is rotatable about a second axis A2' and is in meshing relation with the rack portion 130. The second axis A2' is substantially perpendicular to the first axis A1' When the ETRS system 20 is in the Out-of-Park mode, shown in FIG. 2, the follower 104' is in an extended position. Under certain circumstances, for example when the vehicle is traveling above a threshold speed, the TCM 18 energizes the motor assembly 122 of the park inhibit assembly 32' to prevent movement of the follower 104' thereby locking it in the Out-of-Park position, shown in FIG. 6. When the vehicle is operating at or below the threshold speed, the motor assembly 122 of the park inhibit assembly 32' is de-energized to enable the ETRS system 20 to move to the Park mode if desired by the operator. More specifically, to enable rotation of the lever 62, shown in FIGS. 2 and 3, to the Park position, the motor assembly 122 is de-energized to enable the pinion gear 126 to freewheel against the rack portion 130 of the follower 104'. By de-energizing the motor assembly 122, the follower 104' can be pushed into the bore 106 by the lever 62, thereby enabling rotation of the lever 62 to its Park position. The motor assembly 122 also provides a method of "pulling" the ETRS system 20 into an Out-of-Park mode in the absence of fluid pressure. In this capacity, the motor assembly 122 is energized, thereby allowing the pinion gear 126 to cooperate with the rack portion 130 to move the follower 104' into an Out-of-Park position, as shown in FIG.

6. The follower 104' will engage the pin 78 to urge the lever 62 into rotation, such that the ETRS system 20 is placed in the Out-of-Park mode.

Referring back to FIGS. 1, 2, and 3, the vehicle operator selects a desired transmission range through manipulation of the driver interface device 16. The driver interface device 16 sends an electronic signal to the TCM 18. The TCM 18 then commands a transmission range shift by sending an appropriate signal to the ETRS system 20. The transmission range shift includes shifting the transmission range from the Park mode to the Out-of-Park mode of operation, and enabling the flow of pressurized fluid at a desired transmission line pressure to shift components (not shown) of the transmission 14.

The signal sent from the TCM 18 to the ETRS system 20 actuates the valve solenoid 24 to enable flow of pressurized fluid to the park servo valve 22 through a port 132. This flow of pressurized fluid urges the park servo valve 22 from its first position to its second position. With the park servo valve 22 located in its second position, as shown in FIG. 2, pressurized fluid is supplied from the park servo valve 22 to the hydraulic servo assembly 28. More specifically, the pressurized fluid flows into an inlet port 134 of the park servo valve 22 and through an outlet port 136 and the port 47 into the pressure chamber 48 of the hydraulic servo assembly 28. This flow of pressurized fluid into the pressure chamber 48 causes movement of the servo pin 40 from its first position to its second position, in opposition to the bias force of the spring 50. Such sliding movement of servo pin 40 produces movement of the servo link rod 56 from its first position to its second position, which, in turn, initiates rotation of the lever 62 from its Park position to its Out-of-Park position. Such rotation of the lever 62 induces a pulling force on the actuator rod 82, thereby shifting the transmission to the Out-of-Park mode by disengaging the park pawl assembly 84.

Concurrently, movement of the servo pin 40 of the hydraulic servo assembly 28 to its second position enables movement of the FRE valve 26 from its first position to its second position in response to the bias force of the spring 58. Movement of the FRE valve 26 to its second position permits flow of pressurized fluid from port 60 to port 61. This flow of pressurized fluid is provided to the shifting components of the transmission 14 at the desired line pressure, enabling the transmission 14 to shift to the desired range.

Following actuation of the ETRS system 20 to the Out-of-Park mode, as shown in FIG. 2, the park inhibit assembly 32 is actuated. In particular, the follower 104 biases the pin 78, thereby prohibiting the lever 62 from rotating to its Park position. The park inhibit assembly 32 maintains the follower 104 in its extended position while the vehicle is traveling above the threshold speed. In the event of a loss of fluid pressure, the park pawl assembly 84 is prevented from shifting the transmission 14 into the Park mode of operation while the vehicle is moving. Once the vehicle is operating below the threshold speed, and assuming there is no fluid pressure holding the ETRS system 20 in the Out-of-Park mode, the park inhibit assembly 32 is de-energized to allow the follower 104 to be retracted and permit the torsion spring 51 to rotate the lever 62 to shift the transmission to the Park mode.

The ETRS system 20 can be manually actuated in the event of a loss of electrical power and fluid pressure within the vehicle. An accessible handle or cable (not shown) is connected for rotation with the manual shaft 66. A vehicle operator or maintenance personnel can manually rotate the manual shaft 66 using the handle or cable to induce rotation of the lever 62 from its Park position to its Out-of-Park position. As described above, rotation of the lever 62 enables shifting of the transmission 14 to the Out-of-Park mode. In this manner, the vehicle is free to roll without the transmission prohibiting rolling motion.

Figure 7:
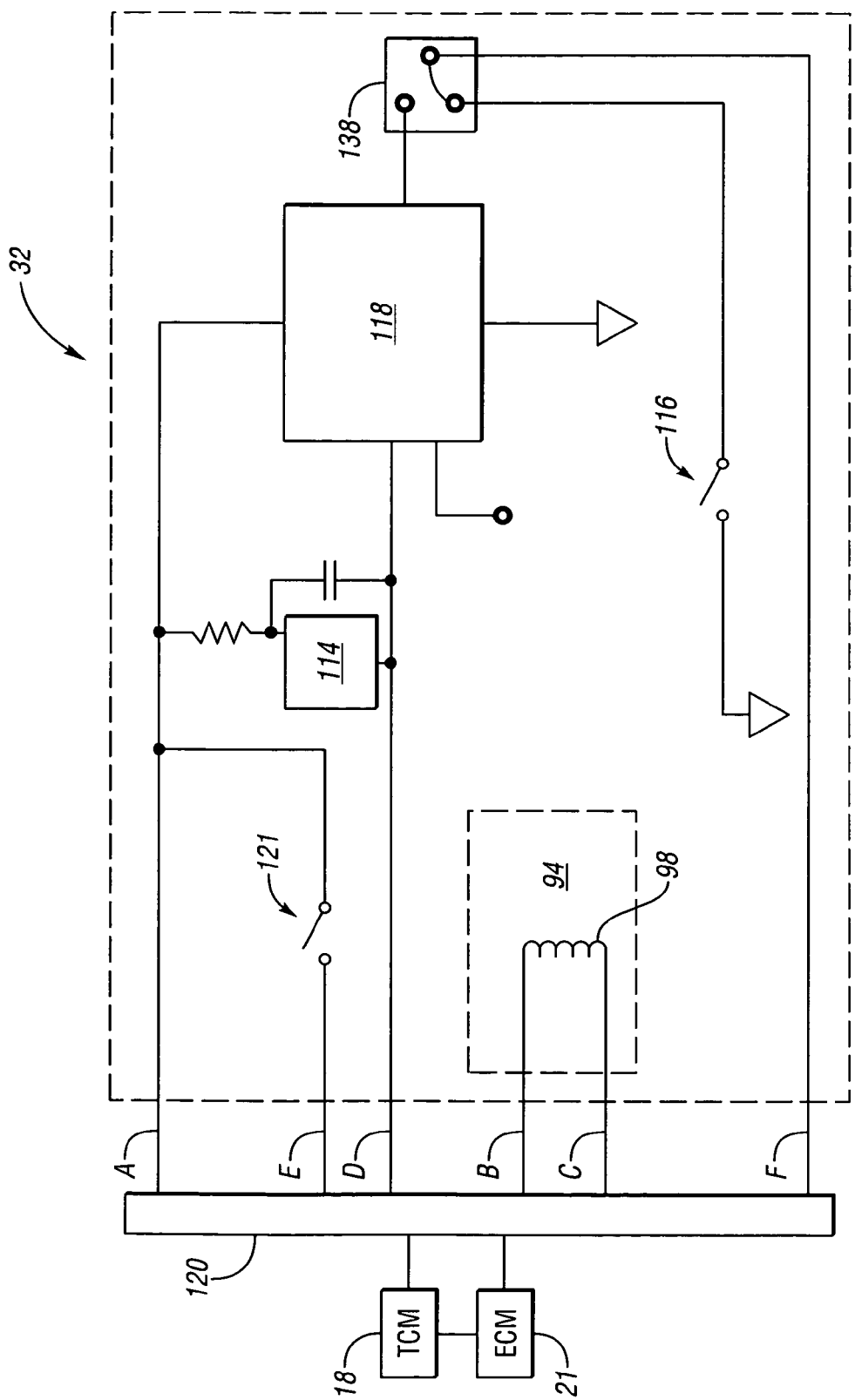
FIG. 7 illustrates the basic schematic configuration of the electronic components within the park inhibit assembly.

FIG. 7 illustrates the basic schematic configuration of the electronic components within the park inhibit assembly 32. As stated hereinabove, the wire harness 120 is in electrical communication with the TCM 18 and the ECM 21. Additionally, the TCM 18 and ECM 21 may be in electrical communication with one another. A plurality of electrical conductors, or leads, A-F constitute the wire harness 120. Lead A communicates a supply voltage to the park inhibit assembly 32. Lead E operates to communicate a voltage value from the hydraulic switch 121 to the TCM 18. Should the transmission 14, shown in FIG. 1, lose hydraulic pressure, the hydraulic switch 121 will open thereby interrupting the voltage signal to the TCM 18 over lead E.

To insure that the solenoid assembly 94 will provide the necessary force to provide the capability to inhibit the Park mode under extreme conditions, such as system voltage and transmission temperature, without excessive current draw from the solenoid driver circuitry within the TCM 18, the solenoid coil 98 is designed with a relatively low resistance value. The current to the solenoid coil 98 is preferably controlled by pulse width modulating voltage across the solenoid coil 98. The TCM 18 monitors inputs, such as transmission fluid temperature and voltage, and then produces a pulse width modulated signal with the appropriate percent duty cycle to provide the desired average current to the solenoid coil 98. Those skilled in the art will appreciate that there are multiple methods to energize the solenoid coil 98 of the solenoid assembly 94, such as voltage and current manipulation, to provide the required force over a range of operating temperature and voltage.

The TCM 18 selectively communicates this pulse width modulated voltage to the solenoid coil 98 of the solenoid assembly 94 over the lead B, while lead C is eventually grounded. By selectively energizing the solenoid coil 98 over lead B, the park inhibit assembly 32 can lock the ETRS system 20, shown in FIGS. 2 and 3 in the Out-of-Park mode. The Hall effect switch 114 is in electrical communication with the supply voltage in lead A and selectively communicates a voltage over lead D to the TCM 18. Additionally, the output voltage from the Hall effect switch 114 and the supply voltage of lead A may be communicated to the printed circuit board 118, which, as stated earlier, includes a voltage modifier such that the diagnostic and position signals of the park inhibit assembly 32 is compatible with other TCMs. The voltage modifier may be an operational amplifier or op-amp such as, for example, an inverting amplifier.

The park inhibit assembly 32 may also include a jumper circuit 138. The jumper circuit 138 selectively and alternately connects the output of the printed circuit board 118 and the mechanical contact switch 116 with the lead F. With the jumper circuit 138 in a first position, as shown in FIG. 7, lead F communicates with the mechanical contact switch 116. As described earlier, the mechanical contact switch provides the necessary signal voltage to the ECM 21 should the TCM 18 lose power. The voltage signal over lead F will indicate to the ECM 21 whether the transmission 14 is in the Park mode of operation, and if so, will allow the engine 12 to start. Alternately, if the mechanical contact switch 116 is open, the voltage signal over lead F is interrupted indicating that the transmission 14 is in the Out-of-Park mode of operation and the ECM 21 will prohibit the engine 12 from starting. With the jumper circuit 138 in a second position the output of the printed circuit board 118 is communicated via lead F.

While the best modes for carrying out the invention have been described in detail, those familiar with the art to which this invention relates will recognize various alternative designs and embodiments for practicing the invention within the scope of the appended claims.

The invention claimed is:

1. A transmission for a vehicle comprising:
    an electronic transmission range selection system operable to shift a transmission range, including shifting from a Park mode to an Out-of-Park mode and from said Out-of-Park mode to said Park mode;
    a selectively engageable park pawl mechanism operable to enforce said Park mode when engaged and to allow said Out-of-Park mode when disengaged;
    a park inhibit assembly movable with said park pawl mechanism and operable to block the engagement of said park pawl mechanism when the vehicle is operating above a predetermined speed; and
    wherein said park inhibit assembly includes a follower member movable with said park pawl mechanism along a first axis between an extended position, corresponding to said Out-of-Park mode, and a retracted position, corresponding to said Park mode;
    wherein said park inhibit assembly includes an electromechanical device energizable and operable to move along a second axis, substantially perpendicular to said first axis, to engage said follower member when said follower member is in said extended position to block the engagement of said park pawl mechanism and de-energizable and operable to move along said second axis to disengage said follower member and allow said follower member to move along said first axis between said extended position and said retracted position.

2. The transmission of claim 1, wherein said park inhibit assembly further comprises a mechanical contact switch operable to provide position signals for said follower member when the transmission is in said Park mode and said Out-of-Park mode.

3. The transmission of claim 1, wherein said electronic transmission range selection system and said park inhibit assembly are mounted internally with respect to the transmission.

4. The transmission of claim 1, wherein said electro-mechanical device is a selectively energizable solenoid and said follower member includes a recess, said solenoid being operable to engage said recess of said follower member when said solenoid is energized such that the movement of said follower member within said park inhibit assembly is prohibited.

5. The transmission of claim 1, wherein said electro-mechanical device is a selectively energizable motor, said motor being operable to drive a pinion gear that is in meshing contact with a rack portion provided on said follower member.

6. The transmission of claim 5, wherein said motor is operable to selectively move the transmission from said Park mode to said Out-of-Park mode.

7. The transmission of claim 1, wherein said park inhibit assembly further comprises a Hall effect switch operable to provide diagnostic and position signals for said follower member when the transmission is in said Park mode and said Out-of-mode.

8. The transmission of claim 7, wherein said park inhibit assembly further comprises a printed circuit board, said printed circuit board being operable to modify said signals.

9. A park inhibit assembly for a transmission shiftable between a Park mode and an Out-of-Park mode, the park inhibit assembly comprising:
    a body structure;
    a follower member at least partially slidably disposed along a first axis within said body structure and having at least one recess provided thereon; and
    a selectively energizable solenoid disposed along a second axis in a generally perpendicular relation to said first axis of said follower member, said solenoid having a plunger operable to move along said second axis and engage said recess when said solenoid is energized, thereby locking the transmission in the Out-of-Park mode and subsequently allowing the transmission to move to the Park mode when said solenoid is de-energized.

10. The park inhibit assembly of claim 9, wherein the park inhibit assembly further comprises a mechanical contact switch operable to provide position signals for said follower member when the transmission is in said Park mode and said Out-of-Park mode.

11. The park inhibit assembly of claim 9, further comprising:
    a ball; and
    wherein said plunger urges said ball into engagement with said recess.

12. The park inhibit assembly of claim 9, wherein the park inhibit assembly further comprises a Hall effect switch operable to provide diagnostic and position signals for said follower member when the transmission is in the Park mode and the Out-of-Park mode.

13. The transmission of claim 12, wherein the park inhibit assembly further comprises a printed circuit board, said printed circuit board being operable to modify said signals.

14. A park inhibit assembly for a transmission shiftable between a Park mode and an Out-of-Park mode, the park inhibit assembly comprising:
    a body structure;
    a follower member at least partially slidably disposed along a first axis within said body structure; and
    a selectively energizable motor disposed along a second axis in a generally perpendicular relation to said first axis of said follower member, said motor being operable to drive a pinion gear in meshing relation with a rack portion of said follower member about said second axis, said motor being operable to prevent movement of said follower member along said first axis to lock the transmission in the Out-of-Park mode when energized and subsequently allowing said follower member to move along said first axis to allow the transmission to move to the Park mode when said motor is de-energized.

15. The park inhibit assembly of claim 14, wherein the park inhibit assembly further comprises a mechanical contact switch operable to provide position signals for said follower member when the transmission is in said Park mode and said Out-of-Park mode.

16. The park inhibit assembly of claim 14, wherein said motor is operable to selectively shift the transmission from the Park mode to the Out-of-Park mode.

17. The park inhibit assembly of claim 14, wherein the park inhibit assembly further comprises a Hall effect switch operable to provide diagnostic and position signals for said follower member when the transmission is in the Park mode and the Out-of-Park mode.

18. The transmission of claim 17, wherein the park inhibit assembly further comprises a printed circuit board, said printed circuit board being operable to modify said signals.

* * * * *